(12) United States Patent
Cypher et al.

(10) Patent No.: US 8,606,997 B2
(45) Date of Patent: Dec. 10, 2013

(54) CACHE HIERARCHY WITH BOUNDS ON LEVELS ACCESSED

(75) Inventors: Robert Cypher, Saratoga, CA (US);
Haakan Zeffer, Santa Clara, CA (US);
Anders Landin, San Carlos, CA (US)

(73) Assignee: Oracle America, Inc., Redwood City, CA (US)

( * ) Notice: Subject to any disclaimer, the term of this patent is extended or adjusted under 35 U.S.C. 154(b) by 856 days.

(21) Appl. No.: 12/343,065

(22) Filed: Dec. 23, 2008

(65) Prior Publication Data

US 2010/0161904 A1 Jun. 24, 2010

(51) Int. Cl.
*G06F 12/00* (2006.01)
(52) U.S. Cl.
USPC ........... 711/122; 711/117; 711/118; 711/130; 711/141
(58) Field of Classification Search
None
See application file for complete search history.

(56) References Cited

U.S. PATENT DOCUMENTS

| 6,108,764 A * | 8/2000 | Baumgartner et al. ......... 712/28 |
| 6,684,298 B1 * | 1/2004 | Dwarkadas et al. .......... 711/128 |
| 2007/0067578 A1 * | 3/2007 | Kurichiyath .................. 711/141 |

OTHER PUBLICATIONS

Jim Handy, The Cache Memory Book, 1998, Academic Press, 2nd Ed, pp. 144-149, 156-159.*

* cited by examiner

*Primary Examiner* — Matthew Bradley
*Assistant Examiner* — Alan Otto
(74) *Attorney, Agent, or Firm* — Polsinelli PC

(57) ABSTRACT

The present invention is directed to a system managing data in a multilevel cache memory system. Certain cache data is designated and stored only in particular levels of the multi-level cache, bypassing other levels of the multilevel cache. In a multiprocessor environment, the present invention includes cache coherency operations or messages that pertain to data stored only in certain levels of a multilevel cache.

20 Claims, 5 Drawing Sheets

CACHE HIERARCHY WITH BOUNDS ON LEVELS ACCESSED

FIELD OF THE INVENTION

The present invention is directed to systems and methods for managing data in a cache memory.

BACKGROUND

Cache memory systems are used in modern computing to provide a processor with copies of recently or repeatedly used data. Typically, a cache memory system is operable to provide data to the processor at higher speeds in comparison to other memory system components. In this way, a cache memory may increase the speed and efficiency at which a processor operates.

Multilevel cache memory systems operate on the same principle, but provide a small and faster cache level that the processor may access initially. If the requested data item cannot be found in the initial cache access, higher levels of the cache may be accessed. While the speeds of the subsequent cache access are fast in comparison to memory components such as main memory, these accesses can be slow in comparison to the first initial cache memory access.

SUMMARY

The present invention is directed to a system and method for storing certain data in only a portion of a cache memory system. Data may be marked or otherwise flagged as being stored only in a portion of the cache when the data is allocated in the cache. Additionally, a message may be sent to a directory or other memory component indicating that the stored data is only in a portion of the cache. When the data so allocated is later victimized, the data may be removed from only a portion of the cache. When the data so allocated is later invalidated, the data may be invalidated from only a portion of the cache. In this regard, the directory or other memory component that issued the invalidate request may include in the request an indication that the data to be invalidated is or was stored only in a portion of the cache.

In one embodiment, the present invention is directed to a method of managing data, including: determining that a request for a data item is designated as a first type of request; performing a cache access for the data item in a lower level of a multilevel cache, the multilevel cache including a hierarch having at least the lower level and a higher level; in response to a cache miss for the data item in the lower level, receiving the data item from a memory, the memory not including the higher level of the multilevel cache; and storing the data item in the multilevel cache as a cache line, wherein the cache line is allocated in the lower level and not allocated in the higher level.

In another embodiment, the present invention is directed to a cache system, including: a multilevel cache having a hierarchy including at least a lower level and a higher level; and a cache controller connected to the multilevel cache; wherein the cache controller is operable to store a cache line in the lower level and not in the higher level.

In another embodiment, the present invention is directed to a cache system, including: means for caching data, the means for caching data having a hierarchy including at least a lower level and a higher level; and means for controlling the means for caching, wherein the means for controlling is connected to the means for caching; wherein the means for controlling is operable to store a cache line in the lower level of the means for caching and not in the higher level of the means for caching.

DETAILED DESCRIPTION

Figure 1:
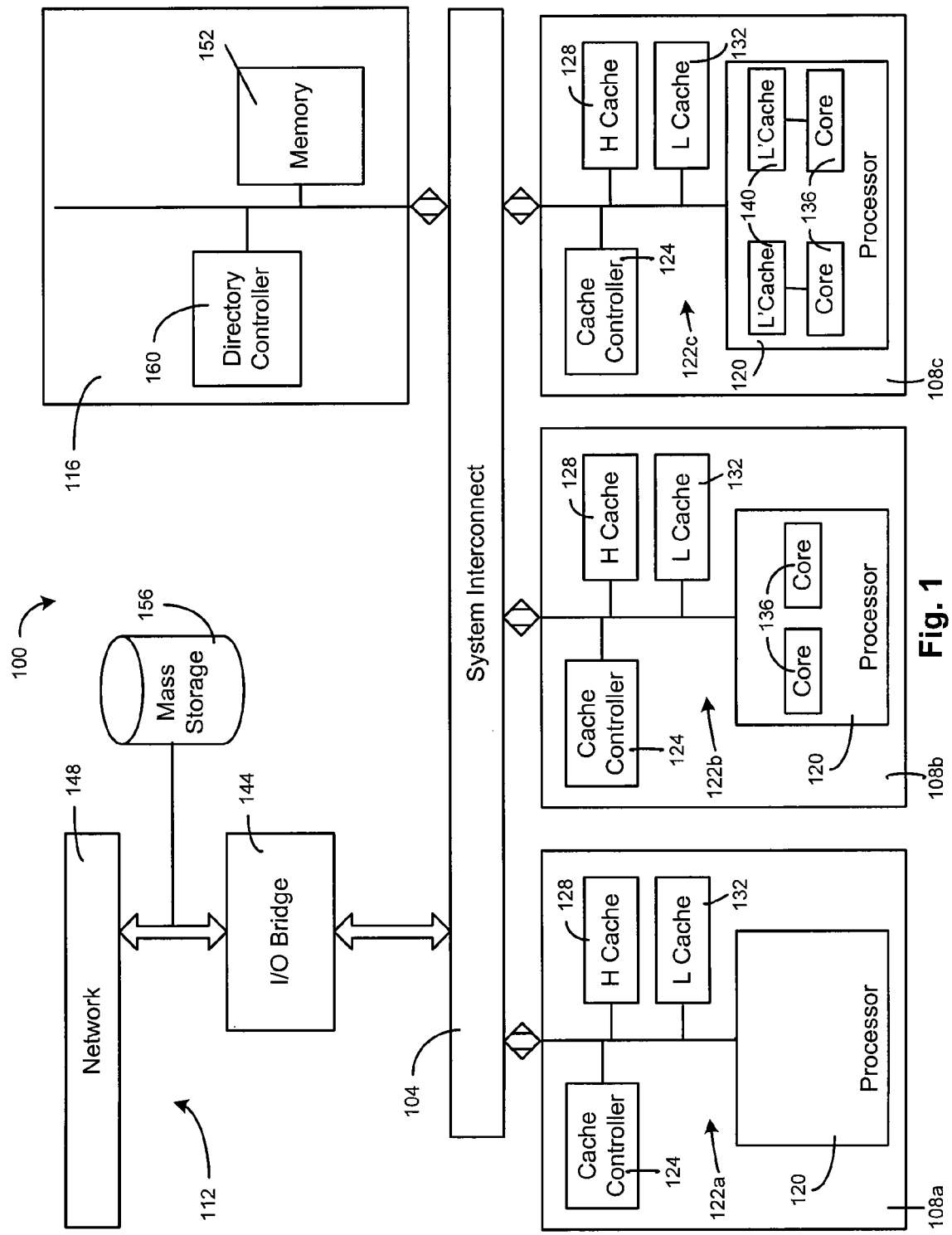
FIG. 1 is schematic illustration of a computer system showing components and features of the present invention.

Aspects of the present disclosure are directed to a system and method for storing certain data in only a certain level or levels of a cache memory of a computer system. In particular, certain data or types of data are designated and stored in lower levels of a multi-level cache system and not stored in higher levels of the multi-level cache system. Generally, a "cache" or "cache memory" refers to a component of a computer or computer system that is part of a memory subsystem and is typically located between a processor and higher levels of the memory subsystem, such as main memory. Typically, a cache is used to store copies of data that ultimately reside on a hard drive or main memory component of the computer system. A cache memory may typically be accessed at faster speeds than those of a main memory or mass storage system. Accordingly, a cache memory may be used to store data that is expected to be repeatedly used by the processor, as well as for other reasons. In this way, processor execution times may be increased by avoiding latencies associated with accessing slower memory components.

A cache memory may include a plurality of levels. In a multi-level cache system, a hierarchical relationship is typically defined between memory levels. Specifically, in requesting a particular item of data the processor will access a first level of the cache system, such as an L1 cache. If the requested data item is not found in this first level, the second level, such as an L2 cache, will be accessed and so on. Ultimately, main memory is accessed if the requested data item cannot be found in the highest level of cache memory. As used herein, the first cache level accessed by the processor is referred to as the "lowest" or "lower" level cache. Subsequent levels accessed by the processor are referred to herein as being "higher" in the memory hierarchy than the previously accessed levels. Said another way, "lower" is a relative term indicating logically closer to the processor. Similarly, the term "higher" indicates logically more distant from the processor.

In some computer systems, different cache levels may be implemented using different memory technologies. For instance, a lower level cache may be implemented using SRAM technology, whereas a higher level cache may be implemented using DRAM technology. In this way, the various advantages of the different memory technologies may be exploited by their placement within the memory hierarchy. In particular, as will be appreciated by one skilled in the art, SRAM technology typically has a faster access time when compared to DRAM technology. In contrast, with the same footprint, DRAM technology has a higher storage capacity when compared to SRAM technology. For this and other reasons, it may be the case that processor accesses to a higher level cache memory may be costly in terms of latency and bandwidth. Various implementations discussed herein operate to reduce these costly accesses to higher levels of a cache memory, amongst other advantages.

FIG. 1 is a schematic illustration of a computer system showing components and features of the present invention. The system 100 generally includes a number of subsystems interconnected by means of a system interconnect 104. Generally, the system 100 shown in FIG. 1 is a multi-processor shared memory computer system. In that regard, the system 100 includes a number of processor subsystems 108a-c. The system 100 additionally includes an input and output ("I/O") subsystem 112 and a memory subsystem 116. The system interconnect 104 that interconnects the various subsystems may be any network or bus type connection that facilitates communication between various components of a computer system. While the computer system 100 shown in FIG. 1 includes a number of processors, it should be appreciated that various implementations discussed herein may be used in connection with a uniprocessor system.

An example processor subsystem 108a generally includes a processor 120 provided in association with a multi-level cache memory 122. The multi-level cache memory 122 generally includes a cache controller 124, a higher level cache 128 and a lower level cache 132. The cache controller 124 generally controls accesses to the lower level cache 132 and the higher level cache 128 that are initiated by the processor 120 and/or other accesses that occur through the system interconnect 104. The lower level cache 132 resides or is logically proximate to the processor 120. Generally, the lower level cache 132 and the higher level cache 128 temporarily store copies of data, the original copies of which ultimately reside higher in the memory hierarchy. Higher levels of the memory hierarchy may include components associated with the memory subsystem 116. The cache controller 124 may provide an interface between the processor subsystem 108 and the system interconnect 104. Accordingly, transactions that occur across the system interconnect 104, including those to and from higher levels of the memory hierarchy, may occur through or may be facilitated by the cache controller 124.

It should be appreciated that the processor subsystem 108a and system components are illustrated schematically in FIG. 1. In this regard, no particular chip set configuration is implied. For instance, the processor 120 may be implemented on a particular die or chip that includes one or both of the lower level cache 132 and the higher level cache 128. Alternatively, one or more of the higher level cache 128 or lower level cache 132 may be implemented off chip with respect to the processor 120. Similarly, the cache controller 124 and the processor 128 may be integrated onto the same chip or die.

Various implementations are described herein in connection with a cache hierarchy that includes a lower level cache 132 and a higher level cache 128. It should be appreciated that various implementations discussed herein may be used in connection with a cache memory system that includes any number of cache hierarchy levels. Additionally, one or more of the cache hierarchy levels may be associated with a number of processor cores. FIG. 1 includes illustrations of alternative processor subsystems. In particular, processor subsystem 108b includes a processor 120 having two separate processor cores 136. The processor subsystem 108c includes a processor 120 having two processor cores 136 each being connected to a lowest level cache memory 140, referred to herein as an L' cache.

A cache controller 124 in accordance with various implementations discussed herein may be operable to store certain types of data in a particular level of the cache system. With respect to the processor subsystem 108a, the cache controller 124 may be operable to store certain cache lines in the lower level cache 132 only. As used herein, this type of cache access or cache data is referred to as "L-only." More specifically, L-only accesses or data are designated as bypassing and/or not accessing certain higher levels of a cache memory 122, such as the higher level cache 128. For illustrative purposes, L-only data is described herein as being associated with one cache level only. However, it should be appreciated that multiple cache levels such as the L' cache level 140 may be used to store L-only data. Accordingly, as used herein, "L-only" data or accesses should be understood as bypassing or otherwise not accessing certain higher level(s) of a cache memory 122, such as the higher level cache 128.

The lower level cache 132 and the higher level cache 128 may include cache lines organized into cache blocks. The blocks may be allocated according to the various schemes known in the art such as, for example, fully associative, set associative or direct mapped. A cache line is a discrete portion of a cache that contains or may contain a copy of a data item, the original copy of which resides higher in the memory hierarchy. Each cache line may be accessed with reference to a particular address. With respect to the cache memory 122, an address may include a block address and a block offset. A particular cache line may additionally be associated with a tag that specifies block location information, as well as other status information associated with the particular cache line.

As used herein, the contents of a cache memory or cache line are generally referred to as "data." It should be appreciated that in referring to the contents of a cache or cache line as "data" or a "data item," no implication is made with regard to the form or content of the cache line. As is known in the art, some computer systems implement separate caches for instruction cache lines and data cache lines. While the present invention is discussed herein using the generic term "data," no particular cache system type is implied. Accordingly, the present invention may be used in connection with instruction caches, data caches, mixed caches and so on.

As is known in the art, accesses to a cache memory 122 may be categorized in terms of whether the access is a read or a write, and in terms of whether the accessed data item is or is not in the cache memory 122. If the cache or cache level does not have a copy of the requested data, a cache miss is said to occur. If the cache or cache level does have the requested data item, a cache hit is said to occur. In this way, at least four types of cache memory 122 accesses can be defined, namely: a write miss, a write hit, a read miss and a read hit.

With respect to write type accesses to the cache memory 122, the cache controller 124 may implement a particular write policy. In a write-through type policy, a write to a cache line that is present in either the lower level cache 132 or the higher level cache 128 will be propagated to higher levels of the memory hierarchy. In this way, changes to a data item that occur within the cache memory 122 are reflected immediately in the original copy of the data item that resides in higher levels of the memory hierarchy. In contrast, a write-back type policy may be implemented by the cache controller 124. In a write-back type policy, writes to a cache line are not immediately propagated to higher levels of the memory hierarchy. In a write-back policy, higher levels of the memory hierarchy may be updated with new data only at certain predetermined times. In one instance, this may occur when a cache line is replaced or "victimized" in order to make room for newly cached data.

Accordingly, in one instance, a write-back cache controller 124 may update higher levels of the memory hierarchy, such as components associated with the memory subsystem 116, with a new value of a cache line upon victimization of the cache line. In a write-back policy, typically a status bit is included in the cache line tag that identifies a state of the cache line. More particularly, the cache line may be identified as "dirty" or "clean." As is known in the art, a dirty cache line is one that has been written to and higher levels of the memory hierarchy have not been updated to reflect the cache line write. Similarly, a clean cache line is one that has not been written.

Higher levels of the memory hierarchy may include components of a memory subsystem 116. As shown in FIG. 1, a memory subsystem 116 may include a main memory 152 that provides a central location for the shared addressable memory space used by the various processor subsystems 108a-c. Main memory 152 is typically a volatile type memory that stores data for use by the processor 120. FIG. 1 illustrates a centralized memory subsystem 116, however, it should be appreciated that various implementations discussed herein may be implemented in connection with a distributed memory subsystem 116. In this regard, various portions or subsets of the addressable memory 152 may reside logically closer or more proximate to the processor subsystems 108a-c.

The memory subsystem 116 additionally may include a directory controller 160. Generally, the directory controller 160 may be operable to control accesses to main memory 152 and/or the mass storage 156 that occur across the system interconnect 104. Moreover, the directory controller 160 may be used to implement a particular cache coherency protocol. As is known in the art, multi-processor systems such as the one illustrated in FIG. 1 may implement a cache coherency protocol in order to manage the various shared copies of data that are used by the various processors 120.

In a directory-based cache coherency protocol, a centralized component, such as directory controller 160, may be used to record and track the various shared copy of data that may exist throughout the system 100. As is known in the art, a shared copy of a data item is one that is or may be present in a number of separate cache memories 122. For instance, both the lower level cache 132 associated with processor subsystem 108a and the lower level cache 132 associated with processor subsystem 108b may have a copy of the same data item, the original copy of which ultimately resides in the main memory 152. The two separate cache memories may maintain or continue to access their respective shared copies of the data item provided no changes are made to the data item. In this way, the data item exists in a shared state.

If, at a particular time, one of the processors 120 writes to or otherwise alters a cached data item, the copy of the data item will no longer be in a shared state. In this case, the processor 120 who is writing to the cache line may take ownership of the cache line. Through this, the cache line may be designated as being in a modified state. Designating a particular copy of a data item as being in a modified state includes invalidating other shared copies of the data item. As is known in the art in connection with directory-based cache coherency protocols, this type of state transition may be managed by the centrally located directory controller 160. In particular, if a processor 120 wishes to write to a cache line, a message or other transaction is sent to the directory controller 160 that requests write privileges for the cache line. In response, the directory controller 160 may issue a particular message to all other cache memories 122 having a shared copy of the cache line. This message indicates that the shared copies of the data item are to be invalidated and, accordingly, not to be used as they will be out of date following the cache line write.

A directory controller 160, in accordance with embodiments in the present invention, may be operable to record and track which processor subsystems 108a-c have a shared copy of a cache line that is designated as L-only. Additionally, a directory controller 160 in accordance with various implementations discussed herein may be operable to direct cache controllers 124 to invalidate L-only copies of a particular cache line. In allocating certain data to a lower level cache 132 only and by tracking this allocation, various implementations discussed herein may be operable to increase processor performance by limiting the number of costly accesses to the higher level cache 128.

Certain data is designated as being L-only due to the fact that the data is not likely to be reused by the processor 120. In one embodiment of the present invention, a Direct Memory Access ("DMA") is defined as being L-only. As is known in the art, DMA accesses include data sent directly from a memory component to an external destination. With respect to FIG. 1, a DMA access may occur through the I/O subsystem 112.

As shown in FIG. 1, the I/O system 112 may include an I/O bridge 144 that provides a connection to a remote or downstream network 148. Additionally, the I/O bridge 144 may be connected to or otherwise provide access to a mass storage system 156 or component. The mass storage system 156 is typically a non-volatile storage system that is operable to store long-term data. The mass storage system 156 and the main memory 152 may operate together to provide a virtual memory system that provides an expanded addressable space to the processors 120. The I/O system 112 shown in FIG. 1 is a separate or discrete component from the other subsystems. It should be appreciated however that alternative implementations may include an I/O system 112 associated with each processor subsystem 108a-c. In this way, the processor 108a-c may initiate an I/O transaction through the system interconnect 104 via a dedicated I/O interface.

Typically, a DMA access may provide data that resides in the cache memory 122 or in main memory 152 to a computational component that resides on the network 148. In the instance of DMA access to or from the cache memory 122, the present invention designates the data associated with the DMA access as L-only. Here, it is anticipated that the data so transferred would not be used again in the immediate future by the processor 120. Accordingly, bandwidth is preserved by not allocating or writing this type of data to the higher level cache 128. Similarly, bandwidth is saved at a later time when the higher level cache 128 will not have to be accessed in order to invalidate a corresponding cache line.

In accordance with various implementations discussed herein, certain pre-fetch instructions are designated as L-only. As is known in the art, pre-fetch instructions are special instructions that inform or otherwise direct the processor 120 to move a specified data or instruction cache line into a cache. Such pre-fetch instructions typically request data (or instructions) prior to when the data (or instruction) will actually be needed. In this way, latency is saved when the data or instruction is needed. In accordance with various implementations discussed herein, it is anticipated that certain data or instructions will not be needed again after their initial or most recent use. These instructions may include, without limitation, reads and writes that occur only once. These instructions are referred to herein as "read-once" and "write-once." Accordingly, certain embodiments designate pre-fetch data and/or instructions associated with read-once and/or write-once as being L-only.

In accordance with certain various implementations discussed herein, certain load and/or store instructions are designated as L-only. As is known in the art, load and store instructions move data to and from the processor 120 and memory 152. Certain load and/or store instructions, referred to herein as "block load" and "block store," move large amounts of data to and from memory. In accordance with various implementations discussed herein, it is anticipated that data associated with block loads and/or block stores will not likely be reused. Accordingly, certain implementations designate block loads and block stores are being L-only.

Figure 2:
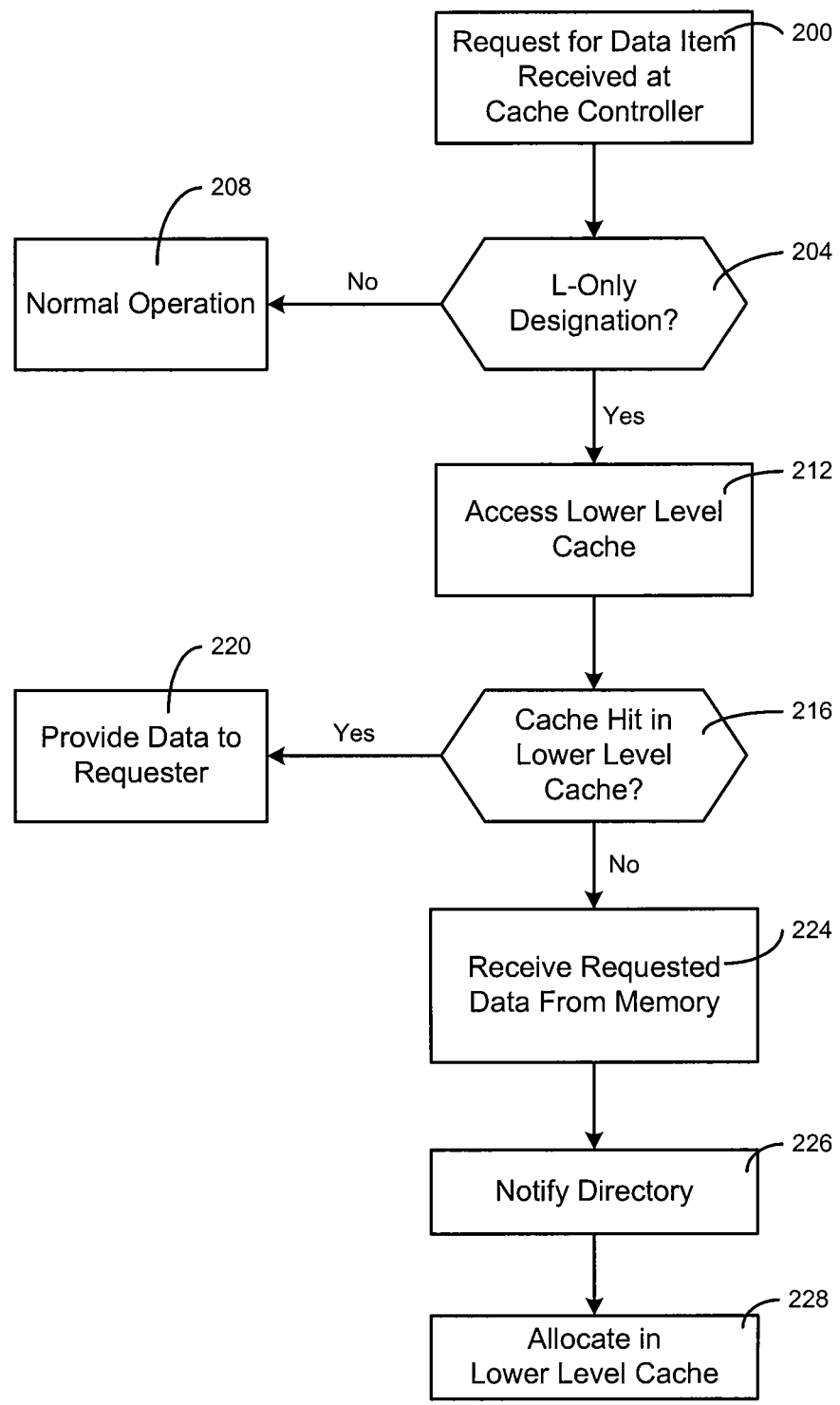
FIG. 2 is a flow chart illustrating a method of managing data in a cache memory in accordance with embodiments of the present invention.

Turning now to the operation of a cache controller 124, reference is made to FIG. 2. FIG. 2 is a flowchart showing a method for managing data in accordance with various implementations discussed herein. More particularly, the flowchart of FIG. 2 illustrates a method of allocating cache lines in a multilevel cache 122. Initially, at step 200, a request for a cache line or other data item occurs or is received by the cache controller 124. This request could be, for example, a fetch or other operation of the processor 120 to retrieve a data item. An original copy of the data item may ultimately reside in the memory subsystem 116 and one or more copies of the data item may be contained in cache memory 122. After the request occurs at operation 200, operation 204 may be executed.

At operation 204, a determination is made regarding whether the data request and subsequent cache access is designated as L-only. This determination may be made in a number of ways. In one embodiment, the requested data item may include a flag or other indicator that designates the requested data as being L-only. The requested data item may be permanently designated as L-only or dynamically assigned this status, such as through a software operation. Various implementations discussed herein designate certain instructions or request types as L-only. These may include without limitation, DMA accesses, pre-fetch for read-once, pre-fetch for write-once, block load and block store.

If, at operation 204, it is determined that the request is not designated as L-only, operation 208 may be executed. At operation 208, the cache controller 124 operates under conventional conditions. This includes accessing successive levels of the cache memory 122 to retrieve the requested data item, ultimately accessing the memory subsystem 116 if the data item is not found in the various levels of cache memory 122.

If, at operation 204, it is determined that the data request is an L-only type request, operation 212 may be executed. At operation 212, the lower level cache 132 is accessed to determine if the lower level cache 132 has a copy of the requested data item. Following operation 212, operation 216 may be executed. At operation 216, a determination is made regarding whether the lower level cache 132 contains the requested data item. At operation 216, a cache hit or a cache miss occurs. In the case of a cache miss, the requested data item is not located in the lower level cache 132. In the case of a cache hit, the requested data item is located in the lower level cache 132.

After a cache hit to the lower level cache 132 at operation 216, operation 220 may be executed. At operation 220, the cache controller 124 provides the requested data item to the processor 120 from the lower level cache 132. After a cache miss to the lower level cache 132 at operation 216, operation 224 may be executed. At operation 224, the cache controller 124 issues a message or other request to receive the requested data item from the memory subsystem 116. Notably, here the higher level cache 128 is bypassed or not accessed to retrieve the requested data item.

Bypassing the higher level cache 128 does not assure or guarantee that the requested data item is not contained in the higher level cache 128. It may be the case that the data has not yet been designated as L-only. In this case, the data may in fact be cached or stored in the higher level cache 128. In this case, the directory 160 or other memory subsystem 116 component may instruct cache controller 124 to receive or be sent the data item from the higher level cache 128. In this way, the requestor may fulfill its own request.

In a multi-processor environment, operation 226 may be executed in combination with operation 224. Operation 226 includes sending a message as part of the request to the directory controller 116 indicating that an L-only copy of the data item is requested. In this way, the directory controller 116 may be provided with information that may be used to track the location of various copies of the data item including those copies that are indicated as being L-only. This aspect of the present invention is explained in greater detail below.

Once a copy of the data item is received from the memory subsystem 116 at operation 224, operation 228 may be executed. At operation 228, a copy of the data item is allocated in the lower level cache 132 as a cache line. In allocating the L-only cache line, operation 228 may additionally include marking the cache line as being L-only. This may include setting a status bit or flag associated with the cache line tag.

FIG. 2 illustrates an operation of the cache controller 124 that results in an L-only cache line being allocated or written only to lower levels of the cache memory 122, such as the lower level cache 132. Here, the allocated cache line is placed in only the lower level portion of the cache memory 122 and not in other levels of the cache 122, such as the higher level cache 128. With the cache line allocated as L-only, victimization of this cache line is thereby affected. In particular, when and if the cache line needs to be removed from the cache memory 122, the cache line only need be removed from the lower level cache 132. Victimizing an L-only cache line is discussed in connection with FIG. 3.

Figure 3:
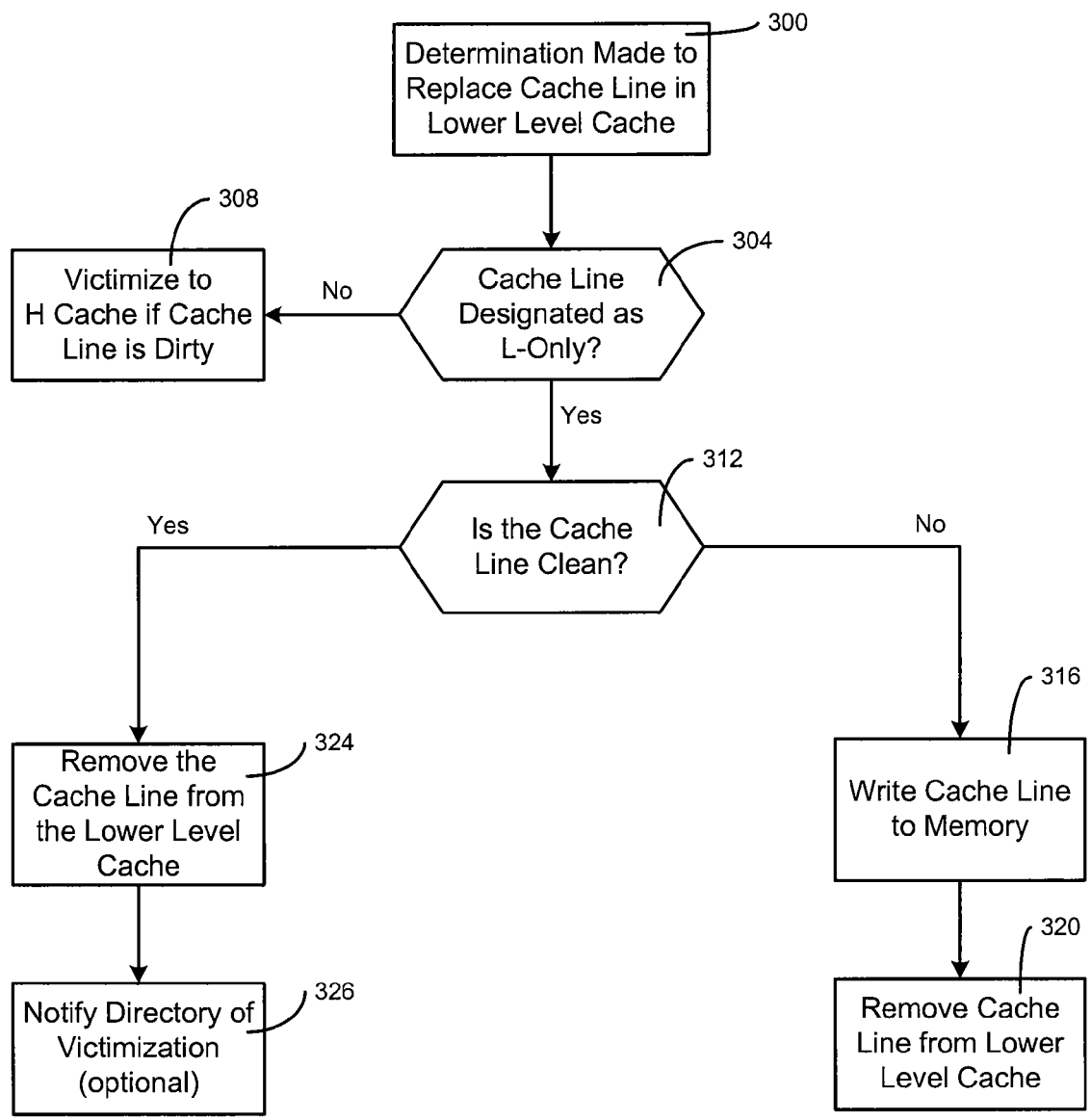
FIG. 3 is flow chart illustrating a method of replacing a cache line in accordance with embodiments of the present invention.

FIG. 3 is a flowchart showing a method for managing data in accordance with various implementations discussed herein. More particularly, FIG. 3 includes a flowchart showing steps in a method of replacing or victimizing a cache line that includes L-only designated data. Initially, at operation 300, the cache controller 124 determines that a cache line needs to be replaced. A cache line may need to be replaced for a variety of reasons. In one instance, the cache line is chosen to be replaced by the cache controller 124 in order to make room for a newly cached data item. The cache line to be replaced may be chosen due to the fact that it has been the least recently used cache line. As can be appreciated by one skilled in the art, other cache line replacement policies may be used by the cache controller 124. After it is determined that the cache line needs to be replaced, operation 304 may be executed.

At operation 304, a determination is made regarding whether the cache line to be replaced is designated as L-only. This may include checking one or more status bits that may be associated with the cache line tag. If it is determined that the cache line is not designated as L-only, operation 308 may be executed. At operation 308, the cache line is victimized to the higher level cache 128 if it is dirty. As is known in the art, this may include allocating a cache line to the higher level cache 128 if none exists yet and/or writing the cache line to the higher level cache 128 in the event that the cache line is dirty.

If, at operation 304, it is determined that the cache line is designated as L-only, operation 312 may be executed. At operation 312, a determination may be made regarding whether the cache line is clean. If it is determined that the cache line is not clean (i.e. dirty), the cache line is written back to the memory subsystem 116, at operation 316. Once the dirty cache line has been written back to the memory subsystem 116, the cache line may be replaced or victimized from the lower level cache 132, at operation 320.

If, at operation 312, a determination is made that the cache line is clean, operation 324 may follow. (It should be noted that in the event that a write-through type write policy is implemented, operation 312 is not executed. In a write through policy, the current value of the cache line will be reflected in copies of the data that reside in higher levels of the memory hierarchy. Accordingly, the cache line can be assumed to be clean. In this case, operation 324 may follow directly from operation 304.) At operation 324, the cache line may be replaced or victimized from the lower level cache 132. More particularly, as the cache line is clean, its value is reflected in the data that resides higher in the memory system hierarchy. Therefore, no memory write operation needs to occur. In one embodiment, the cache line may be removed and discarded without any further actions being taken. Removing the cache line from the lower level cache 132 in this way is referred to as a "silent victimization." In a silent victimization, no other computational components such as the memory system 116 are aware of the victimization.

As an alternative to a silent victimization, the cache controller 124 may notify other system components of the victimization at optional operation 326. At operation 326, the cache controller 124 sends a message or other notice to the memory subsystem 116 or other component indicating that the cache controller 124 has victimized the L-only cache line from the lower level cache 132. In this way, the directory controller will know not to send invalidate messages on future write-misses or other operations that require ownership of the cache line.

FIG. 2 and FIG. 3 illustrate, respectively, methods for allocating and victimizing an L-only cache line. In addition to these operations, an L-only cache line may be invalidated. Invalidating of a cache line occurs in a multi-processor environment having a plurality of cache memories that share data. For example, referring to FIG. 1, the processor 120 associated with processor subsystem 108b may request an item of data that is not contained in its cache memory 122. Here, a write-miss occurs. On the write-miss, an invalidate request or command is sent by the directory controller 124 to other cache memories 122, such as those associated with processor subsystems 108a and 108c, that have a shared copy of a data item that is being written to or otherwise being placed in a modified state by the processor subsystem 108b. The invalidate request occurs because the data held in the other cache memories will no longer be valid following the completion of the data write that is occurring in the processor subsystem 108b. Handling of invalidate requests in accordance with various implementations is discussed below. In connection with this discussion, FIG. 4 illustrates a method for receiving the invalidate request and FIG. 5 illustrates a method for generating the invalidate request when L-only data may be involved.

Generally, in a multilevel cache 122, multiple copies of a cache line may exist within the cache 122. In particular, a cache line in the lower level cache 132 may be a copy of a cache line that is in the higher level cache 128, and so on. Accordingly, processing an invalidate request in a cache controller 124 generally includes invalidating all copies of the cache line that exist in the cache memory 122. Various implementations discussed herein preserve bandwidth and increase execution times by curtailing or otherwise shortening the processing of an invalidate request. With this in mind, reference is made to FIG. 4.

Figure 4:
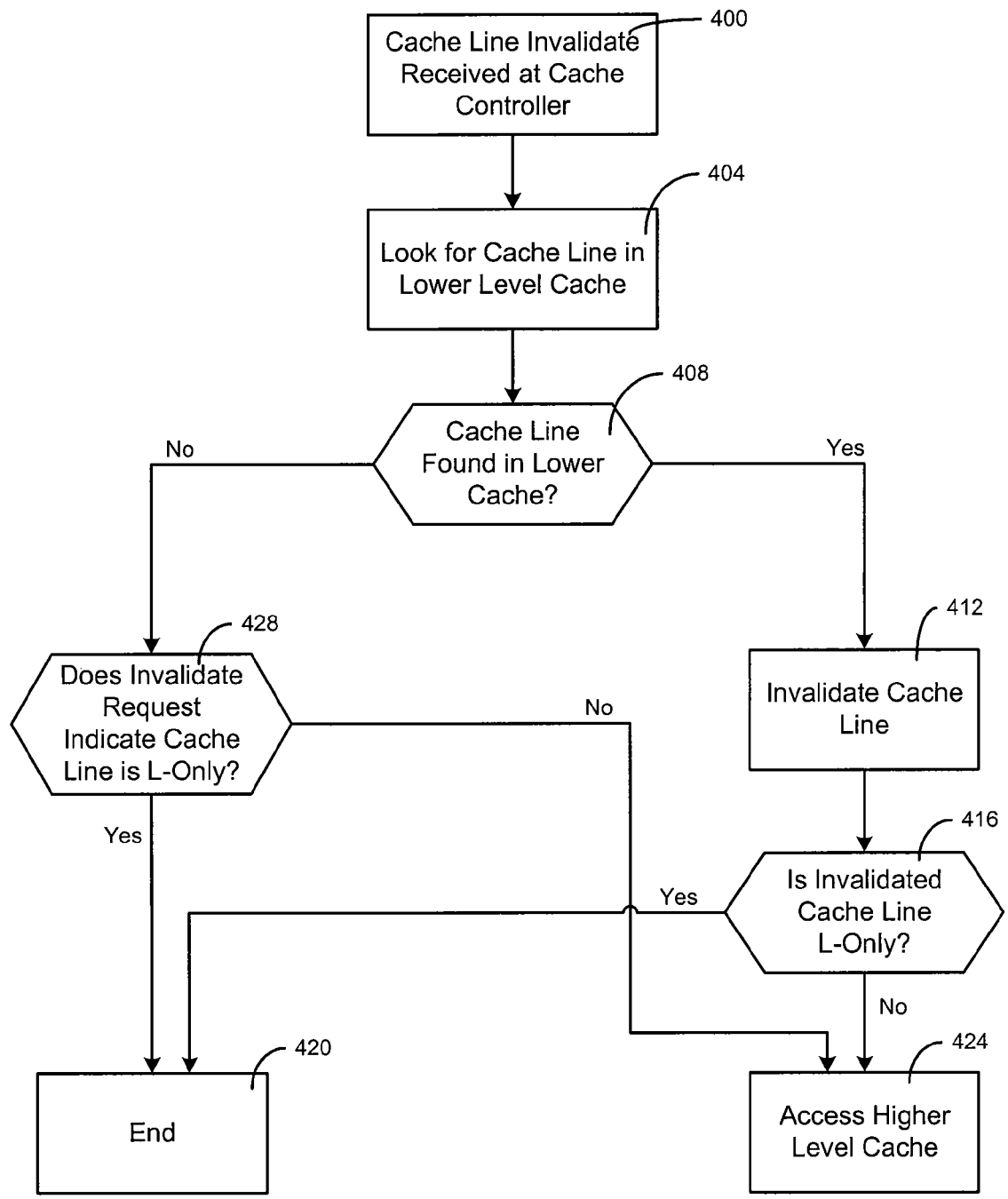
FIG. 4 is a flow chart illustrating a method of invalidating a cache line in accordance with embodiments of the present invention.
Figure 5:
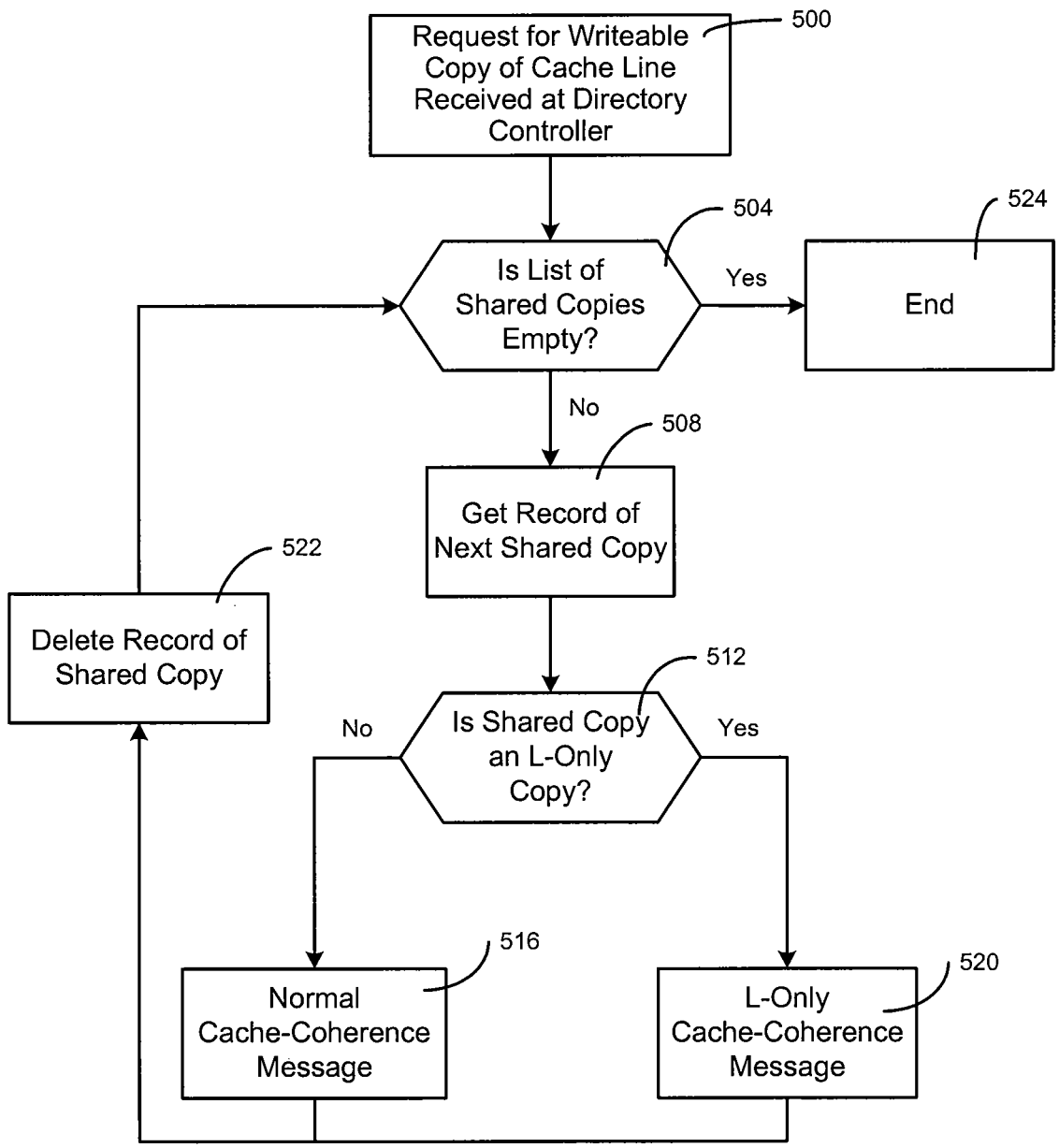
FIG. 5 is a flow chart illustrating a method of sending invalidate requests in accordance with embodiments of the present invention.

FIG. 4 is a flowchart showing operations in a method for managing data in accordance with various implementations discussed herein. More particularly, FIG. 4 illustrates operations of a cache controller 124 in connection with invalidating cache lines. Initially, at operation 400, the cache controller 124 receives an invalidate message from the directory controller 160. This may occur due to the cache line being placed in a modified state by the directory controller 160. As in the above example, this may occur on a write-miss in the processor subsystem 108b. (Continuing with this example, the invalidate request may be received at, for example, the processor subsystem 108a) After the invalidate request is received at operation 400, operation 404 may be executed.

At operation 404, the cache controller 124 accesses the lowest level in the memory hierarchy in order to locate the cache line that is to be invalidated. As described herein, the lowest level in the cache memory is accessed first, however, this is not necessary. Higher levels of the memory hierarchy may be accessed before or in parallel with lower levels. With specific reference to processor subsystem 108a, the lower level cache 132 is accessed at operation 404. After operation 404, operation 408 may be executed. At operation 408, a determination is made regarding whether the cache line is contained in the lower level cache 132.

If, at operation 408, it is determined that the cache line is in the lower level cache 132, operation 412 may be executed. At operation 412, the cache line is invalidated in the lower level cache. This may include setting a bit or flag in the cache line tag indicating that the cache line no longer contains current data. In the event that the cache line is dirty, the cache line may be written to memory 152. With the invalidate bit or flag set, the processor 120 will not use the data stored in the cache line in future cache access. Instead, the current value of the data item will be retrieved from memory 152. After the cache line is invalidated in operation 412, operation 416 may be executed.

At operation 416, a determination is made regarding whether the invalidated cache line is an L-only type cache line or includes L-only marked data. In making this determination, the cache controller 124 may refer to a status bit or other flag that may be present in the cache line tag. Alternatively, the cache line invalidate message from the directory controller 116 may include an indication that the cache memory 122 contains an L-only copy of the cache line. The directory 160 may specifically track the location of L-only copies of a data item.

If, at operation 416, it is determined that the cache line is not an L-only copy, operation 424 may be executed. At operation 424, the cache controller 124 proceeds under normal operating conditions. More particularly, the cache controller proceeds to invalidate the cache line within higher levels of the cache memory 122.

If, at operation 416, it is determined that the cache line is an L-only copy, operation 420 may be executed. At operation 420, the process of invalidating cache lines may end. As it is known here that the cache line is designated as L-only and the cache line as been invalidated in the lower level cache 132, it is the case that the cache line has been invalidated throughout the cache memory 152. In this way, the cache line is invalidated from the cache memory 152, without an access to the higher level cache 128 occurring. In not accessing the higher level cache 128, latency is thereby reduced and/or bandwidth is saved.

It is noted that in the event that the cache line has been victimized (from processor subsystem 108a) prior to the cache line being placed in a modified state (by processor subsystem 108b), the cache memory 122 (of processor subsystem 108a) may not have a record of the cache line having been in the cache 122. Moreover, if the cache line was silently victimized, the directory controller 160 may still have a record that the cache memory 122 (of processor subsystem 108a) has a copy of the cache line. Accordingly, when an invalidate message is received from the directory controller 160, the cache controller 124, by itself, may not recognize that the cache line to be invalidated is an L-only copy. Accordingly, the directory controller 160 may include a specific message indicating that the cache controller 124 should invalidate its L-only copy. In this way, the cache controller 124 will know not to proceed further in the event that the cache line is not found in the lower level cache 132. More particularly, the cache controller 124 will forego access to the higher level cache 128 that would normally occur on an invalidate message. With this in mind, reference is made again to operation 408.

If, at operation 408, it is determined that the cache line is not in the lower level cache 132, operation 428 may be executed. At operation 428, a determination is made regarding whether the cache line to be invalidated is an L-only copy. In accordance with various implementations discussed herein this includes examining or otherwise receiving an indication in connection with invalidate request. The directory controller 160 tells the cache controller 124 both to invalidate the cache line and that the cache line to be invalidated is an L-only copy. If, at operation 428, it is determined that the cache line to be invalidated is not an L-only copy, the cache controller may proceed as normal (Operation 424) If, at operation 428, it is determined that the cache line to be invalidated is an L-only copy, no further actions or cache accesses need occur (Operation 420). In this way, costly access to the higher level cache 128 are avoided even in the event of a silent victimization.

Generally, a directory controller 160 may keep or maintain a record of all shared copies of a cache line that are contained in the various cache memories that are associated with the directory controller. This shared copy record may exist in a list or other appropriate format. In addition to recording that a particular cache memory has a shared copy of a cache line, the directory controller may also record the fact that the cache memory has an L-only copy. With this in mind, reference is made to FIG. 5.

FIG. 5 is a flowchart showing operations in a method for managing data in accordance with various implementations discussed herein. More particularly, FIG. 5 illustrates operations of a directory controller 160 in connection with invalidating cache lines that may include L-only data. Initially, at operation 500, an operation that results in ownership of a cache line occurs in a cache memory system associated with the directory controller 160. For example, as in the above example, a write-miss may occur in the processor subsystem 108b. Accordingly, the directory controller 160 may take steps to provide the requesting processor subsystem 108b with a writable copy of the data item.

Providing the requesting processor subsystem 108b with a writeable copy of the cache line may include invalidating all other shared copies of the cache line. Here, the directory controller may cycle through or otherwise reference its list of shared copy locations. In particular, at operation 504, the directory controller 160 determines if the list of shared copies is empty. If the list is not empty, operation 508 may be executed.

At operation 508, the next record in the list of shared copies is retrieved or otherwise accessed. Following operation 508, the cache controller 160 determines if the shared copy is an L-only copy. If the shared copy is not L-only, operation 516 may be executed. At operation 516, a conventional cache coherency message may be sent to the cache controller 124 that has the particular copy of the data item. Here, no particular indication is given as to the level or levels which the cache controller 124 must invalidate.

If, at operation 508, it is determined that the cache line to be invalidated is an L-only type cache line, operation 520 may follow. At operation 520, an L-only cache coherence message is sent to the cache controller 124 that has the particular copy of the data item. This cache coherency message instructs the cache controller 124 to invalidate only its copy of the data item that is contained in the lower level cache 132.

Operation 522 may be executed after either operation 516 or operation 520. At operation 522, the record of the shared copy is deleted from the list associated with directory controller 160. This occurs once a cache coherency message has been sent, whether for normal data or for L-only data.

Following operation 522, the list of shared copies may be checked to determine if it is empty (operation 504). If the list is empty, the process may end at operation 524. If the list is not empty, operation 504 may be executed and the process continues as described above.

It is noted that various implementations discussed herein are discussed above in connection with directory based cache coherency protocols. It is noted that alternative implementations may be used in connection with other cache coherency protocols, such as snooping protocols. In a snooping protocol, a list may be maintained that tracks the shared copies that exist or may have existed in the system 100. This list may be maintained at one or more of the processor subsystems 108a-c, in the memory subsystem 116, or in some other location within the system.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

What is claimed is:

1. A method of managing data in a multilevel cache of a multiprocessor system, comprising:
    receiving a request for a data item from a first processor from a plurality of processors, the first processor associated with a first multilevel cache from a plurality of multilevel caches, each multilevel cache from the plurality of multilevel caches being unique to each processor from the plurality of processors and including a hierarchy having at least a low level cache and a high level cache;
    determining that the requested data item is designated as a first type of data prior to accessing the first multilevel cache for a read type operation, the first type of data being associated with the low level cache;

accessing a first low level cache of the first multilevel cache to retrieve the requested data item designated as the first type of data;

in response to a cache miss for the requested data item in the first low level cache, bypassing the first high level cache when the requested data item is designated as the first type of data and sending a request for the requested data item directly to a memory, the request including a message indicating that the requested data item is the first type of data;

receiving the requested data item from the memory, the memory not including the first high level of the first multilevel cache; and storing the received requested data item in a cache line of the first multilevel cache, the cache line being allocated in the first low level cache and not allocated in the first high level cache of the first multilevel cache, wherein the step of storing the data includes marking the cache line as including the first type of data.

2. The method of claim 1 wherein the step of marking the cache line further includes setting a flag associated with the cache line to indicate that the data item is not to be stored in the high level cache.

3. The method of claim 1 wherein the message indicating that the requested data item is the first type of data is tracked by a directory controller fulfilling the request.

4. The method of claim 1, further comprising:
victimizing the cache line from the first multilevel cache, wherein victimizing the cache line includes removing a content of the cache line from the first low level cache and not allocating the content of the cache line to the first high level cache.

5. The method of claim 4, further comprising:
sending a notification to a directory controller that the cache line has been victimized in the first multilevel cache.

6. The method of claim 5, further comprising:
deleting, in response to receiving the notification, a record indicating that the first multilevel cache has a shared copy of the data item.

7. The method of claim 4, further comprising:
writing the content of the cache line to the memory when the cache line is dirty.

8. The method of claim 1, further comprising:
receiving a cache coherence instruction to invalidate the cache line;
invalidating the cache line when the cache line is found in the first low level cache of the first multilevel cache; and
taking no further action when the cache line is not found in the first low level cache of the first multilevel cache.

9. The method of claim 8, wherein the cache coherence instruction includes an indication that the cache line is not in the first high level cache of the first multilevel cache.

10. A cache system in a multiprocessor system, comprising:
a plurality of multilevel caches associated with a plurality of processors, each of the plurality of the multilevel caches including a cache hierarchy having at least a low level cache and a high level cache, the at least low level cache and the high level cache being unique to each of the plurality of processors; and
at least a first cache controller connected to a first multilevel cache of the plurality of multilevel caches, the first multilevel cache including a first cache hierarchy having at least a first low level cache and at least a first high level cache, the first cache controller operable to control access to the at least the first low level cache and the first high level cache and operable to receive a request for a data item from a first processor associated with the first multilevel cache, the first cache controller further operable to determine that the requested data item is designated as a first type of data prior to accessing the first multilevel cache for a read type operation, the first type of data being associated with the low level cache and operable to access the first low level cache of the first multilevel cache to retrieve the requested data item and to bypass the first high level cache upon a cache miss for the requested data item in the first low level cache when the requested data item is designated as the first type of data, the first cache controller further operable to send a request for the requested data item directly to a memory, the memory not including the first high level cache of the first multilevel cache, the request including a message indicating that the requested data item is the first type of data, and further operable to receive the requested data item from the memory and operable to store the received requested data item in a cache line of the first multilevel cache, the cache line being allocated in the first low level cache and not allocated in the first high level cache of the first multilevel cache, wherein the step of storing the data item includes marking the cache lines as including the first type of data.

11. The cache system in a multiprocessor system of claim 10, wherein the first cache controller, upon victimization of a cache line in the first low level cache, removes a content of the cache line from the first low level cache and does not allocate the content of the cache line to the first high level cache.

12. The cache system in a multiprocessor system of claim 10, further comprising:
a directory controller connected to at least the first cache controller, the directory controller operable to maintain a record of all existing shared copies of the data item designated as the first type of data.

13. The cache system in a multiprocessor system of claim 12, wherein:
upon victimization of the cache line in the first low level cache, the first cache controller sends a notification to the directory controller to indicate that the cache line has been victimized in the first low level cache.

14. The cache system in a multiprocessor system of claim 12, wherein:
upon the cache line being placed in a modified state, the directory controller sends a cache coherence instruction to the first cache controller to invalidate the cache line; and
in response to the cache coherence instruction, the first cache controller removes content of the cache line when the cache line is present in the first low level cache and does not access the first high level cache.

15. The cache system in a multiprocessor system of claim 14, wherein the cache coherence instruction includes an indication that the cache line is designated as not being in the high level cache.

16. A cache system in a multiprocessor system, comprising:
a plurality of a means for caching data, each of the plurality of the means for caching data being unique to at least one processor of the multiprocessor system and having a hierarchy including at least a low level and a high; and
a plurality of a means for controlling the plurality of the means for caching, each of the plurality of the means for controlling operable to control access to a respective means for caching, each of the plurality of the means for controlling operable to receive a request for a data item from a respective processor and operable to determine that the requested data item is designated as a first type of data prior to accessing the respective means for caching for a read type operation, the first type of data being associated with the low level and not the high level of the respective means for caching, and operable to access the low level of the respective means for caching to retrieve the requested data item designated as the first type of data from the low level and operable to bypass the high level of the respective means for caching upon a cache miss for the requested data item when the data item is designated as the first type of data and further operable to send a request for the requested data item directly to a memory, the memory not including the first high level of the respective means for caching, the request including a message indicating that the request data item is the first type of data item, the means for controlling further operable to receive the requested data item from the memory and to store the received requested data item in a cache line in the low level of the respective means for caching and not in the high level of the respective means for caching when data item is designated as the first type of data, wherein the step of storing the data item includes marking the cache line as including the first type of data.

17. The cache system in a multiprocessor system of claim 16, wherein each of the plurality of the means for controlling, upon victimization of the cache line in the respective means for caching, removes the cache line from the low level of the respective means for caching and does not allocate the cache line to the high level of the respective means for caching.

18. The cache system in a multiprocessor system of claim 16, further comprising:

a means for enforcing cache coherency, wherein the means for enforcing is connected to each of the plurality of the means for controlling, the means for enforcing operable to maintain a record of all existing shared copies of the data item;

wherein upon allocation of the cache line in the low level of an at least one of the plurality of the means for caching, the means for controlling the at least one of the plurality of the means for caching sends a message to the means for enforcing to indicate that the cache line in the at least one of the plurality of the means for caching is not in the high level of the at least one of the plurality of the means for caching.

19. The cache system in a multiprocessor system of claim 18, wherein:

upon the cache line in the at least one of the plurality of the means for caching being place in a modified state, the means for enforcing sends a cache coherence instruction to the means for controlling the at least one of the plurality of the means for caching to invalidate the cache line; and in response to the cache coherence instruction, the means for controlling the at least one of the plurality of the means for caching removes the cache line from the low level of the at least one of the plurality of the means for caching when the cache line is present in the low level of the at least one of the plurality of the means for caching and does not access the high level of the at least one of the plurality of the means for caching.

20. The cache system in a multiprocessor system of claim 19, wherein the cache coherence instruction includes an indication that the cache line in the at least one of the plurality of the means for caching is designated as not being stored in the high level of the at least one of the plurality of the means for caching.

* * * * *